US005771384A

United States Patent [19]

Remington et al.

[11] Patent Number: 5,771,384
[45] Date of Patent: Jun. 23, 1998

[54] METHOD AND SYSTEM FOR REPLACEMENT AND EXTENSION OF CONTAINER INTERFACES

[75] Inventors: Darren B. Remington, Issaquah; Brian T. Fleming, Seattle; David E. McCauley, III, Seattle; Jan T. Miksovsky, Seattle; John M. Tippett, Seattle; Scott R. Ludwig, Redmond; Robert F. Day, Bothell, all of Wash.

[73] Assignee: Microsoft Corporation, Redmond, Wash.

[*] Notice: The term of this patent shall not extend beyond the expiration date of Pat. No. 5,682,532.

[21] Appl. No.: 799,960

[22] Filed: Feb. 12, 1997

Related U.S. Application Data

[63] Continuation of Ser. No. 237,357, May 2, 1994, Pat. No. 5,682,532.

[51] Int. Cl.⁶ ........................................ G06F 9/44
[52] U.S. Cl. ........................................ 395/683
[58] Field of Search ........................ 395/680, 682, 395/683

[56] References Cited

U.S. PATENT DOCUMENTS

| | | | |
|---|---|---|---|
| 5,280,610 | 1/1994 | Travis, Jr. et al. | 395/600 |
| 5,335,346 | 8/1994 | Fabbio | 395/600 |
| 5,341,478 | 8/1994 | Travis, Jr. et al. | 395/200 |
| 5,379,430 | 1/1995 | Nguyen | 395/700 |
| 5,396,626 | 3/1995 | Nguyen | 395/700 |

OTHER PUBLICATIONS

Lotus Notes—Database Design Release 2.0, Lotus Development Corporation, Cambridge, Mass., 1991, Chapter 1—"Database Applications," pp. 1–1 through 1–8 and Chapter 7— Creating Views, pp. 7–1 through 7–17.

Press Release: Business Wire, SmartFolders™ Brings NT Power to the Masses of Windows 3.1 Users Now, Atlanta, Georgia, May 26, 1993.

Press Release: Object Productivity Showcases Smart-Folder™ Technology in Microsoft's "Partners in Innovation" Booth at Windows World '93, Atlanta, Georgia, May 24, 1993.

Emigh, Jacqueline, "New for PC: Software for SmartFolders and Windows for Workgroups," *Newsbytes Inc.*, Aug. 31, 1992, NEW08310026, 2 pages.

*Primary Examiner*—Kevin A. Kriess
*Attorney, Agent, or Firm*—Seed and Berry LLP

[57] ABSTRACT

An improved storage mechanism is provided. In a preferred embodiment of the present invention, a container is used for storing objects, links to objects, and other containers. The container of the preferred embodiment is programmable so that the methods of the container are replaceable and the functionality of the container is extendible through the use of a command unit.

27 Claims, 13 Drawing Sheets

METHOD AND SYSTEM FOR REPLACEMENT AND EXTENSION OF CONTAINER INTERFACES

This application is a continuation of U.S. patent application Ser. No. 08/237,357, filed May 2, 1994, U.S. Pat. No. 5,682,532.

TECHNICAL FIELD

The present invention relates generally to data processing systems and, more particularly, to the programmability of containers within data processing systems.

BACKGROUND OF THE INVENTION

Permanent storage devices of conventional computer systems are arranged in a hierarchical fashion. This hierarchy is formed through the use of directories or folders. A folder is a logical grouping of files and other folders. When a user wishes to store information on the permanent storage device of a computer system, the user creates a folder and moves, copies, or creates files in the folder. The functionality associated with a folder is typically defined by a computer system. This functionality may include simply adding and deleting files of a folder. Thus, in conventional computer systems, the user has little control over the functionality of the folder. For example, a user cannot typically restrict the types of files that are stored in a folder nor can a user modify a folder so that all users must observe a checkin-checkout protocol when accessing the files in the folder.

The present invention is described below using some object-oriented techniques; thus, an overview of well-known object-oriented programming techniques is provided. Two common characteristics of object-oriented programming languages are support for data encapsulation and data type inheritance. Data encapsulation refers to the binding of functions and data. Inheritance refers to the ability to declare a data type in terms of other data types. In the C++ language, data encapsulation and inheritance are supported through the use of classes. A class is a user-defined type. A class declaration describes the data members and function members of the class. A function member is also referred to as a method of a class. The data members and function members of a class are bound together in that the function operates on an instance of the class. An instance of a class is also called an object of the class. Thus, a class provides a definition for a group of objects with similar properties and common behavior.

To allocate storage for an object of a particular type (class), an object is instantiated. Once instantiated, data can be assigned to the data members of the particular object. Also, once instantiated, the function members of the particular object can be invoked to access and manipulate the data members. Thus, in this manner, the function members implement the behavior of the object, and the object provides a structure for encapsulating data and behavior into a single entity.

To support the concept of inheritance, classes may be derived from (based upon the declaration of) other classes. A derived class is a class that inherits the characteristics—data members and function members—of its base classes. A class that inherits the characteristics of another class is a derived class. A class that does not inherit the characteristics of another class is a primary (root) class. A class whose characteristics are inherited by another class is a base class. A derived class may inherit the characteristics of several classes; that is, a derived class may have several base classes. This is referred to as multiple inheritance.

A class may also specify whether its function members are virtual. Declaring that a function member is virtual means that the function can be overridden by a function of the same name and type in a derived class. If a virtual function is declared without providing an implementation, then it is referred to as a pure virtual function. A pure virtual function is a virtual function declared with the pure specifier, "=0". If a class specifies a pure virtual function, then any derived class needs to specify an implementation for that function member before that function member may be invoked. A class which contains at least one pure virtual function member is an abstract class.

FIG. 1 is a block diagram illustrating typical data structures used to represent an object. An object is composed of instance data (data members) and function members, which implement the behavior of the object. The data structures used to represent an object comprise instance data structure 101, virtual function table 102, and the function members 103, 104, 105. The instance data structure 101 contains a pointer to the virtual function table 102 and contains data members. The virtual function table 102 contains an entry for each virtual function member defined for the object. Each entry contains a reference to the code that implements the corresponding function member. The layout of this sample object conforms to models defined in U.S. Pat. No. 5.297,284, entitled "A Method for Implementing Virtual Functions and Virtual Bases in a Compiler for an Object Oriented Programming Language," which is hereby incorporated by reference. In the following, an object will be described as an instance of a class as defined by the C++ programming language. One skilled in the art would appreciate that other object models can be defined using other programming languages.

An advantage of using object-oriented techniques is that these techniques can be used to facilitate the sharing of objects. For example, a program implementing the function members of an instantiated object (a "server program") can share the object with another program (a "client program"). To allow an object of an arbitrary class to be shared with a client program, interfaces are defined through which an object can be accessed without the need for the client program to have access to the class definitions at compile time. An interface is a named set of logically related function members ("methods") and data members ("properties"). In C++, an interface is an abstract class with no data members and whose virtual functions are all pure. Thus, an interface provides a published protocol for two programs to communicate. Interfaces are typically used for derivation: a program defines (implements) classes that provide implementations for the interfaces the classes are derived from. Thereafter, objects are created as instances of these derived classes. Objects instantiated from a derived class implementing particular interfaces are said to "support" the interfaces. An object supports one or more interfaces depending upon the desired functionality.

When a client program desires to share an object, the client program needs access to the code that implements the interfaces for the object (the derived class code). To access the derived class code (also referred to as class code), each class implementation is given a unique class identifier (a "CLSID"). For example, code implementing a spreadsheet object developed by Microsoft Corporation may have a class identifier of "MSSpreadsheet," while code implementing a spreadsheet object developed by another corporation may have a class identifier of "LTSSpreadsheet." A persistent registry in each computer system is maintained that maps each CLSID to the code that implements the class. Typically, when a spreadsheet program is installed on a computer system, the persistent registry is updated to reflect the availability of that class of spreadsheet objects. So long as a spreadsheet developer implements each function member defined by the interfaces to be supported by spreadsheet objects and so long as the persistent registry is maintained, the client program can access the function members of shared spreadsheet objects without regard to which server program has implemented them or how they have been implemented.

Since an object may support some interfaces and not others, a client program would need to determine at runtime whether a particular object supports a particular interface. To enable this determination, every object supports the interface IUnknown, which contains a function member, QueryInterface, that indicates which interfaces are implemented for the object. The method QueryInterface is defined as follows:

virtual HRESULT QueryInterface (REFIID iid, void**ppv)=0;

The method QueryInterface is passed an interface identifier in parameter iid (of type REFIID) and returns in parameter ppv a pointer to the implementation of the identified interface of the object for which the method is invoked. If the object does not support the interface, then the method returns a false. The type HRESULT indicates a predefined status.

FIG. 2 is a symbolic representation of an object. In the following description, an object data structure is represented by the shape 201 labeled with the interfaces through which the object may be accessed.

SUMMARY OF THE INVENTION

In accordance with a first aspect of the present invention, a method is executed in a distributed system having a number of computer systems that are connected by a network. In accordance with this method of the first aspect of the present invention, at least one of the computers has a container for storing objects and links. This method provides for the programmability of the container. The programmability of the container is provided through replacing the methods of the container and extending the functionality of the container.

In accordance with a second aspect of the present invention, an improved storage mechanism is provided. The storage mechanism of the preferred embodiment provides for a programmable container. The container of the preferred embodiment contains methods that are replaceable as well as a command unit that extends the functionality of the container.

DETAILED DESCRIPTION OF THE INVENTION

Figure 1:
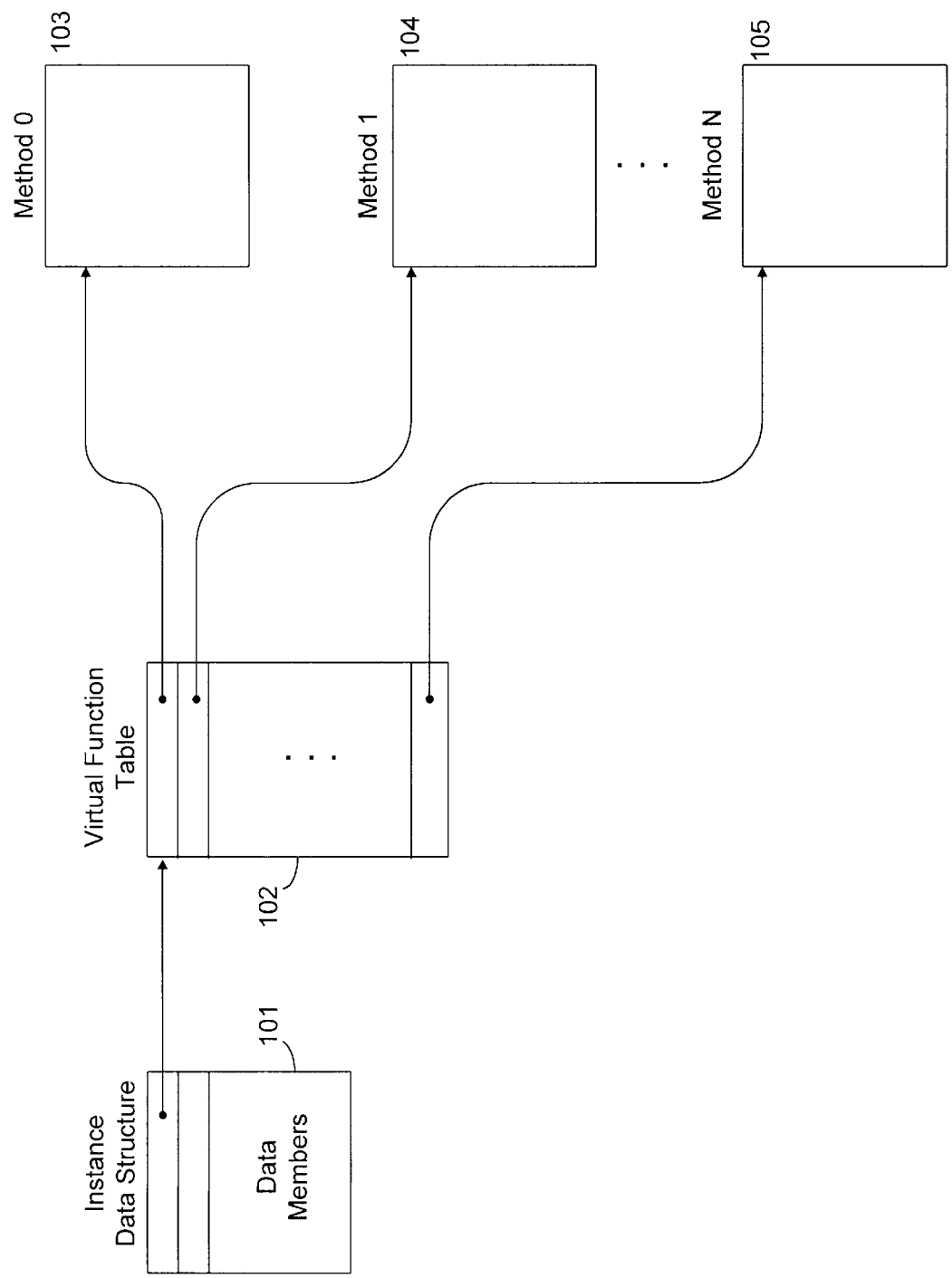
FIG. 1 is a block diagram illustrating typical data structures used to represent an object.
Figure 2:
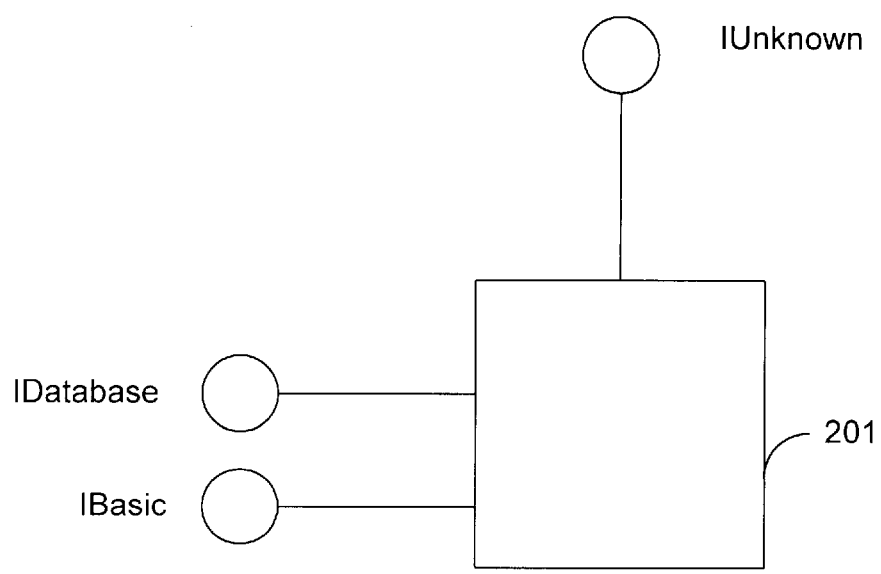
FIG. 2 symbolic representation of an object.

A preferred embodiment of the present invention provides for an improved method and system for storing information in a computer system. In a preferred embodiment, information is stored through the use of a container. A container is an object that contains a collection of data ("contained objects") and that provides an interface through which to access the collection of data. The contained objects can include files, databases, electronic mail messages, bitmaps, other objects, other containers, and various other types of data. In the preferred embodiment, a container is programmable. This programmability is provided by allowing for replacement of the implementation of the interface of the container ("replaceability") and by allowing for the extension of the functionality provided by the interface ("extendibility"). Because containers are replaceable and extendible, the functionality of a container can be tailored to the needs of a user. For example, a user can extend the functionality of a container to limit the types of data that are stored within the container. Thus, containers are a more flexible storage mechanism than conventional folders.

The container of the preferred embodiment provides three interfaces: the IShellContainer interface, the IQueryContainer interface and the IContainerAutomation interface. The IShellContainer interface provides for creating, deleting, moving and copying the contained objects of the container. In addition, the methods of the IShellContainer interface generate events which notify a command unit that a specific method has been invoked. A command unit is a program that requests to be notified when an event occurs. For example, a command unit could be a macro interpreter that allows a user to develop macros to be executed when a container event occurs. Upon receiving the events, the command unit may override the functionality of the method from which the event was generated, or the command unit may augment the functionality of the method. The command unit overrides or augments a method through user defined code. The IQueryContainer interface provides for querying a container for the contained objects according to a selection criteria. The IContainerAutomation interface is layered on top of the IShellContainer interface. As such, the IContainerAutomation interface provides for copying and moving contained objects, as well as storing link objects within a container. A link object is an object that contains a reference to another object.

To replace the functionality of a container, a developer implements various methods of the three interfaces. In this way, a developer may customize a container to perform specialized processing. To extend the functionality of a container, a developer creates user defined code ("event handlers") using the command unit that overrides or augments the functionality of a method that has generated an event. An example of replacing or extending the functionality of a container would be to have the container check to ensure that an object is of a specific type, such as a text document, before allowing the object to be stored (created, moved, copied, or linked) into the container. This functionality is known as restricted storing.

Restricted storing can be performed either through replaceability or extendibility. A developer can provide an implementation of methods in the interfaces of the container that perform storing to replace an existing implementation. For example, a developer would implement a moving method so that the method only moves an object into the container when the object is of a specific type. Also, a developer can create an event handler for the command unit that augments the functionality of the method to perform restricted storing For instance, when a method to move a contained object is invoked and an event is generated, the event handler may be invoked to perform the restricted storing functionality.

In a preferred embodiment, objects can be moved and copied through the use of a clipboard. A clipboard is logically an area of shared memory together with function through which the shared memory is accessed. To move an object from a source container to a destination container, a user first requests the object to place a copy of the object in the clipboard. A user then requests the destination container to move the object from the clipboard and add the object to the destination container. After the object is added to the destination container, a user requests the source container to delete its copy of the object. (The term "user" refers generally to both a person or a computer system or program.)

Figure 3:
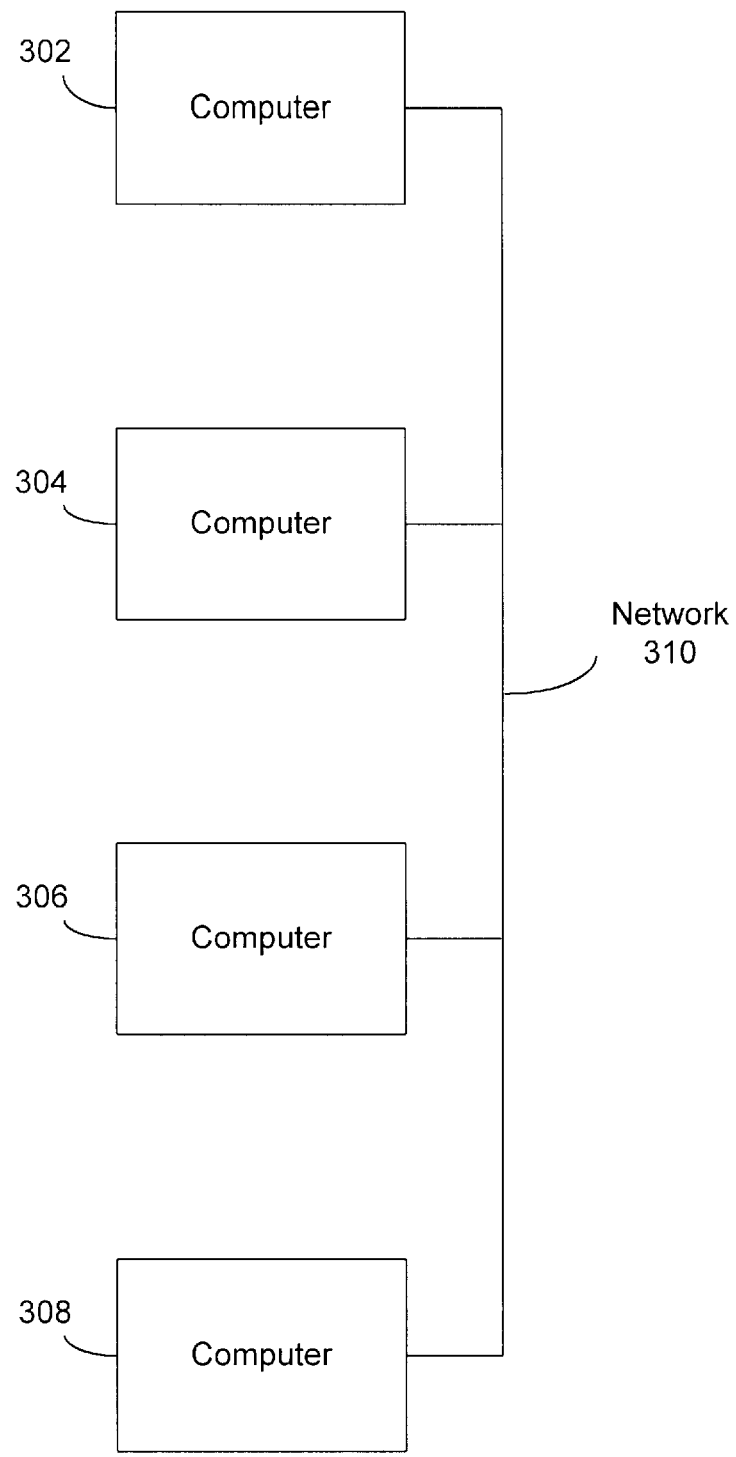
FIG. 3 depicts a distributed system suitable for practicing the preferred embodiment of the present invention.
Figure 4:
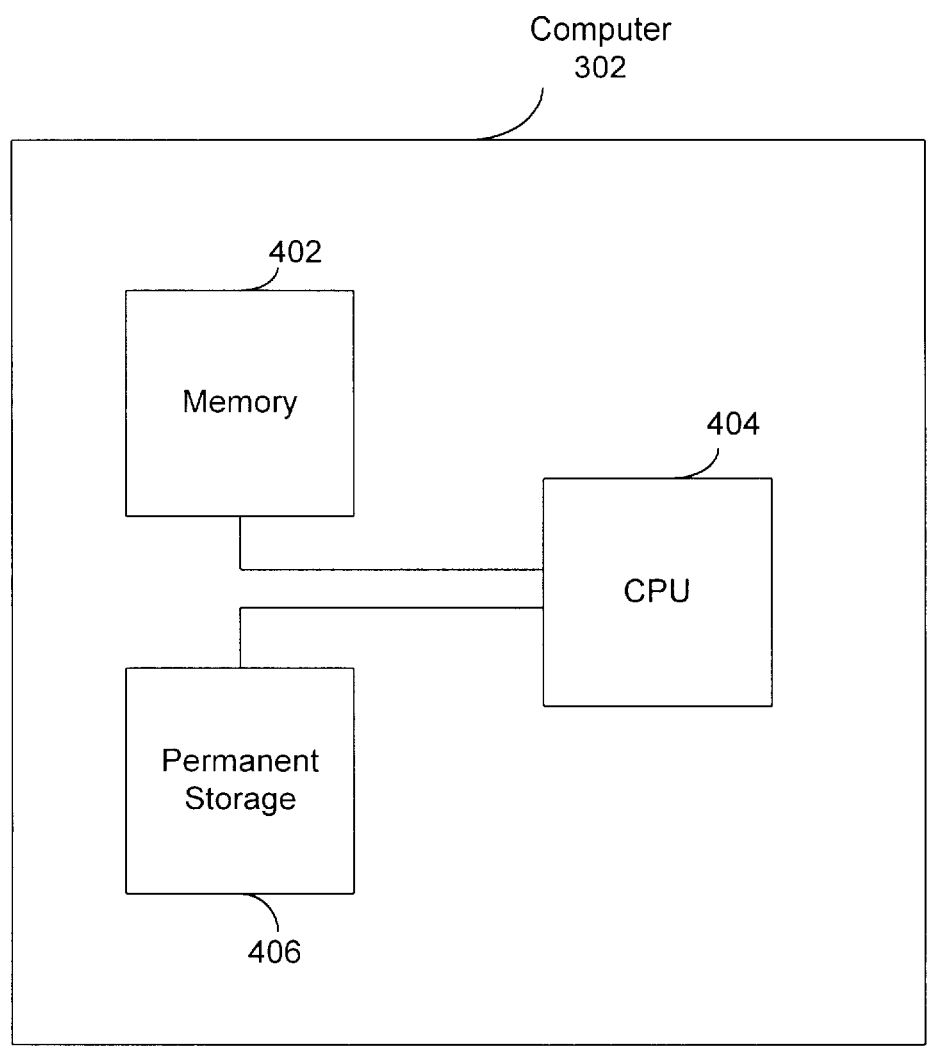
FIG. 4 depicts a more detailed diagram of computer 302 of FIG. 3.

FIG. 3 depicts a distributed system suitable for practicing the preferred embodiment of the present invention. The distributed system contains four computers 302, 304, 306, and 308 connected via a network 310. The network 310 can be any of various communication mechanisms including, but not limited to, a local area network or a wide area network. FIG. 4 depicts a more detailed diagram of computer 302 of FIG. 3. Although only computer 302 is described, the other computers 304, 306, 308 contain similar components. Computer 302 contains a memory 402, a permanent storage device 406, and a central processing unit (CPU) 404. The CPU 404 is responsible for transferring computer programs between the permanent storage device 406 and the memory 402 and executing the computer programs once the computer programs are resident within the memory. The permanent storage device 406 is a storage device for storing information in between invocations of the computer 302. The present invention is described relative to a single computer system.

The preferred embodiment of the present invention is designed to operate in an object-oriented environment, such as an environment that supports the Microsoft OLE 2.0 ("OLE") protocol established by Microsoft Corporation of Redmond, Wash. One skilled in the art will also recognize that embodiments of the present invention can be practiced in a non-object-oriented environment as well.

Figure 5:
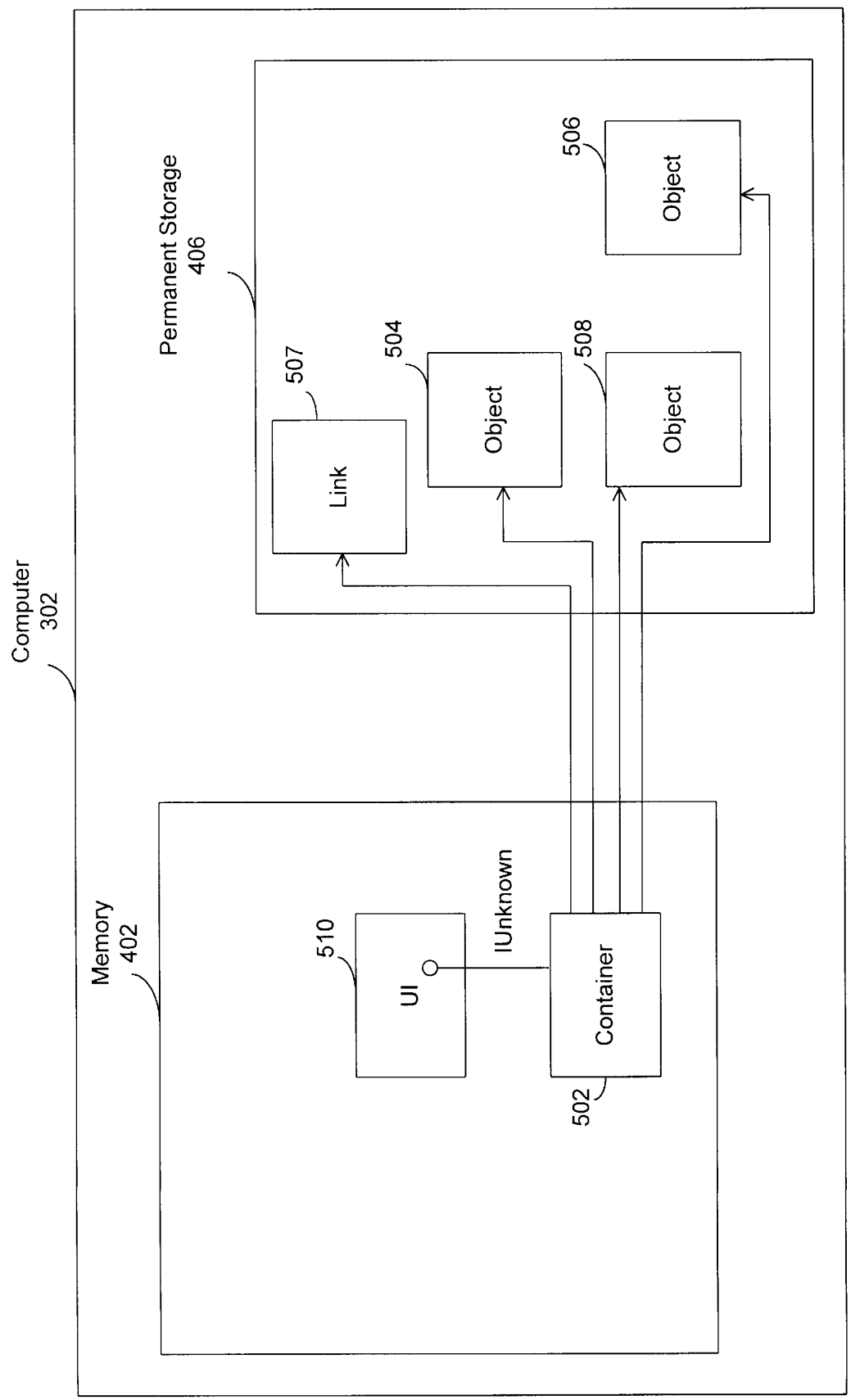
FIG. 5 depicts the preferred embodiment of the present invention within a computer suitable for practicing the preferred embodiment of the present invention.

FIG. 5 depicts the preferred embodiment of the present invention within a computer 302 suitable for practicing the preferred embodiment of the present invention. The memory 402 contains a user interface process (UI) 510 and a container 502 of the preferred embodiment. The UI 510 is a screen-oriented process that interacts with a user. The UI 510 provides access to the container 502, through the IUnknown interface of the container, so that a user can view and manipulate objects 504, 506, 507, 508. Object 507 is a link object which contains a reference to another object. The container 502 logically groups objects 504, 506, 507, 508 which reside on the permanent storage device 406. A container may also contain other containers. An individual object within a container is known as an "item" and the collection of all items within a container is known as "the contents" of the container. Although the contents of the container 502 are described as being stored on the permanent storage device 406, one skilled in the art will appreciate that the contents can be stored in memory, another computer system, or another device, such as a graphic device or audio device. In addition, although only one container is depicted, one skilled in the art will appreciate that many containers may be resident in a computer system suitable for practicing the preferred embodiment of the present invention.

In order to access an item logically grouped within container 502, the UI 510 first obtains a list of the contents of the container. The UI 510 may obtain a list of the contents of the container in two ways, which are described below in detail. First, the UI 510 may obtain a filtered list of items in the container through the use of a query to the container using the IQueryContainer interface specifying a selection criteria. Second, the UI 510 may obtain a list of the contents by directly accessing a complete list of the contents through the IContainerAutomation interface. After obtaining a list of the contents, the UI 510 selects an entry from the list and uses the entry to access the item directly. Each entry in the list of the contents is a reference to an IContainerItem interface to the corresponding item which allows for the direct access of the item. The IContainerItem interface is defined in Code Table No. 1. All code provided herein is described using C++ pseudocode. The IContainerItem interface inherits the IUnknown interface and provides methods for accessing items and provides several "properties." A property is information (e.g., date created) that is associated with an object. Properties are accessible through an invocation method of the interface. The properties are logically represented as data members of the interface.

---

CODE TABLE NO. 1

--- interface IContainerItem: IUnknown {
   Virtual HRESULT delete() = 0;
   Virtual HRESULT move () = 0;
   Virtual HRESULT copy() = 0;
   Virtual HRESULT invoke(ULONG propid, VARIANT * ppropvalue,
     ULONG propaction) = 0;
   VARIANT     Hidden;
   VARIANT     Archive;
   VARIANT     AccessControlList;
   VARIANT     *Application;
   VARIANT     Classifications;
   VARIANT     Comments;
   VARIANT     LastAccessDate;
   VARIANT     LastAccessedBy;
   VARIANT     LastModifiedBy;
   VARIANT     LastModifiedDate;
   VARIANT     Container;
   VARIANT     Moniker;
   VARIANT     ReadOnly;
   VARIANT     Name;
   VARIANT     Size;
   VARIANT     Object;
   VARIANT     Unread;
}

---

The Delete method deletes the corresponding item from the container and frees up the associated storage. To perform this functionality, the Delete method invokes the Delete method of the IShellContainer interface (described below), passing a moniker associated with the item. The moniker of an item is a reference to the item and is stored as a property (the "Moniker" property) in the IContainerItem interface. Monikers are described in detail in U.S. patent application Ser. No. 08/088,724, entitled "Method and System for Naming and Binding Objects," which is hereby incorporated by reference. The Delete method of the IShellContainer interface frees up the associated storage.

The Move method prepares the corresponding item for being moved. That is, the move method places the IContainerItem interface for the item onto the clipboard. The Copy method preferably has the same functionality as the Move method.

The Invoke method of the IContainerItem interface is used to retrieve and set the values of the properties in the IContainerItem interface. The invoke method has three parameters: propid, ppropvalue and propaction. The propid parameter to the invoke method indicates which property is to be accessed. The ppropvalue parameter is a pointer to a memory location returning the value of a retrieved property or passing the value of a property to be set. The propaction parameter indicates whether to retrieve the value of the indicated property or whether to set the value of the indicated property.

The properties of the IContainerItem Interface are tagged as being type VARIANT. The VARIANT type is used to overcome limitations in strongly-typed programming languages. A strongly-typed language typically binds a parameter to a type at compile time. Thus, a parameter can only be of one type. The VARIANT type overcomes this limitation by being defined as a union of all types of variables, thereby making the specification of any one type acceptable to the programming language. The Hidden property is a Boolean variable indicating whether the item is hidden. A hidden item cannot be accessed or viewed by a user interface. The Archive property interface is a Boolean variable indicating whether the item has been modified since the item was last archived. One skilled in the art would recognize that the Archive property is similar to a "dirty bit." By using the Archive property, an archiving utility can determine whether to archive the item. The AccessControlist property is a list containing access privileges to the item. The AccessControlist preferably lists the users allowed to access the item. The Application property is a reference to the application program which can manipulate the data of the item. For example, if the item were a word processing document, the application program indicated by the Application property would be the specific word processor used for editing the item. The Classifications property contains the class identification of the item, that is, the type of item (e.g., MSSpreadsheet). The Comments property is a character string containing various comments that are associated with the item as input from a user through the UI 510.

The LastAccessDate property is a character string containing the date of the last time that the item was accessed. The LastAccessedBy property is a character string containing the name of the last user or application program to access the item. The LastModifiedBy property is a character string containing the, name of the last user or application to modify the item. The LastModifiedDate property is a character string containing the date the item was last modified. The Container property contains a reference to the IUnknown interface of the container from which the item was accessed. The Moniker property contains a reference to a linked object. If the item is not a linked object, then the reference is NULL. The ReadOnly property is a Boolean variable indicating whether the item is only available for read access. The Name property contains the name of the item in a human-readable form. The Size property contains the size of the item in bytes. The Object property contains a reference to the IUnknown interface of the object when the object is instantiated. The Unread property contains whether an item has been opened through the UI 510. The property is used, for example, to determine if a mail message has been read.

As previously stated, a container provides three interfaces through which a UI can manipulate the container and the contents of the container. The three interfaces are: the IShellContainer interface, the IQueryContainer interface, and the IContainerAutomation interface. The IShellContainer interface provides the ability to manipulate the items contained within the container. The methods contained in the IShellContainer interface provide for such functionality as deleting items, creating items, moving items, copying items, linking items, and accessing the data of items. In addition, the methods of the IShellContainer interface generate events. An event is a message generated by the container to apprise another entity that a specific event occurred. An entity that wishes to be apprised of an event registers itself with the container. The entity preferably registers a "callback routine" with the container. When the event occurs, the container invokes the callback routine to apprise the container. These callback routines provide extensions to the container. Alternatively, entities can be apprised through standard interprocess communication mechanisms. The IShellContainer interface and the prototypes for the event callback routines are shown in Code Table No. 2.

CODE TABLE NO. 2

```
Events
    RequestItemAdd(PCONTAINERITEM pContainerItem, BOOL *cancel);
    RequestItemRemove(PCONTAINERITEM pContainerItem, BOOL *cancel);
    DoItemAdd(PCONTAINERITEM pContainerItem, BOOL *enabledefault);
    DoItemRemove(PCONTAINERITEM pContainerItem, BOOL *enabledefault);
    AfterItemAdd(PCONTAINERITEM pContainerItem);
    AfterItemRemove(PCONTAINERITEM pContainerItem);
Interface IShellContainer:IUnknown {
    virtual HRESULT MoveHere(VARIANT *punk, ULONG *pcMonikers, IMONIKER
        ***pppmnk) = 0;
    virtual HRESULT CopyHere(VARIANT *punk, ULONG *pcMonikers, IMONIKER
        ***pppmnk) = 0,
    virtual HRESULT LinkHere(IUNKNOWN *punk, ULONG *pcMonikers,
        IMONIKER ***pppmnk) = 0;
    virtual HRESULT GetDataObject(const ULONG cMonikers, IMONIKER **ppmnk,
        IDATAOBJECT **ppDataObject) = 0;
```

-continued

CODE TABLE NO. 2

```
virtual HRESULT Delete(IMONIKER **ppmnk, ULONG cMonikers) = 0;
virtual HRESULT Create(REFCLSID rclsid, const LPWSTR pwszName,
    SECURITY_DESCRIPTOR *psd, IMONIKER **ppmnk, UNKNOWN
    **ppunk) = 0;
}
```

Events are associated with the adding and removing of items from a container. The events allow the entity that is apprised of an event to perform pre-event and post-event processing, cancel the event, and suppress the default container functionality. A container generates the RequestItemAdd event (invokes the callback routine) when an item is attempted to be added to the container. The RequestItemAdd callback has two parameters: the pContainerItem parameter and the cancel parameter. The pContainerItem parameter is a reference to the IContainerItem interface for the item to be added. The cancel parameter is set by the callback routine and indicates whether the container should proceed with adding the item. A container generates the RequestItemRemove event when the container is requested to delete an item. The parameters for the RequestItemRemove event are similar to those described for the RequestItemAdd event. A container generates the DoItemAdd event right before an item is added to the container. The DoItemAdd event has two parameters: the pContainerItem parameter and the enabledefault parameter. The pContainerItem parameter is a reference to the IContainerItem interface for the item being added. The enabledefault parameter is a Boolean variable which is set by the callback routine and indicates whether the container should perform its default add functionality. A container generates a DoItemRemove event just prior to deleting or removing an item from the container. The DoItemRemove event has analogous parameters as the DoItemAdd event. A container generates the AfterItemAdd event immediately after an item has been added to the container. The AfterItemAdd event has one parameter, which is a reference to the IContainerItem interface for the item being added. A container generates the AfterItemRemove event immediately after an item has been removed from the container and its parameter is a reference to the item being deleted.

The IShellContainer interface has six methods: the MoveHere method, the CopyHere method, the LinkHere method, the GetDataObject method, the Delete method and the Create method. The methods return a return code "HRESULT" to the caller indicating the success or failure of the particular method. The MoveHere method of the IShellContainer interface moves an item into the container. The punk parameter of the MoveHere method is a reference to the DataObject interface of the item to be moved. The IDataObject interface is an interface used for transferring an item as described in U.S. patent application Ser. No. 08/199,853, entitled "Uniform Data Transfer," which is hereby incorporated by reference. If, however, more than one item is being moved into the container, the punk parameter contains a reference to an IUnknown interface of an object that contains other objects, which is known as a multi-data object. The method can retrieve the references to the objects of the multi-data object by enumerating the objects. By using the punk parameter in this way, a caller can move more than one item at a time. The pcMonikers parameter of the MoveHere method is a return parameter containing a count of the number of items moved into the container. The pppmnk parameter is a triple pointer return parameter referring to the monikers of the items moved into the container. The pppmnk parameter is an optional parameter, thus, if set to NULL, the MoveHere method does not return the monikers to the caller.

Figure 6A:
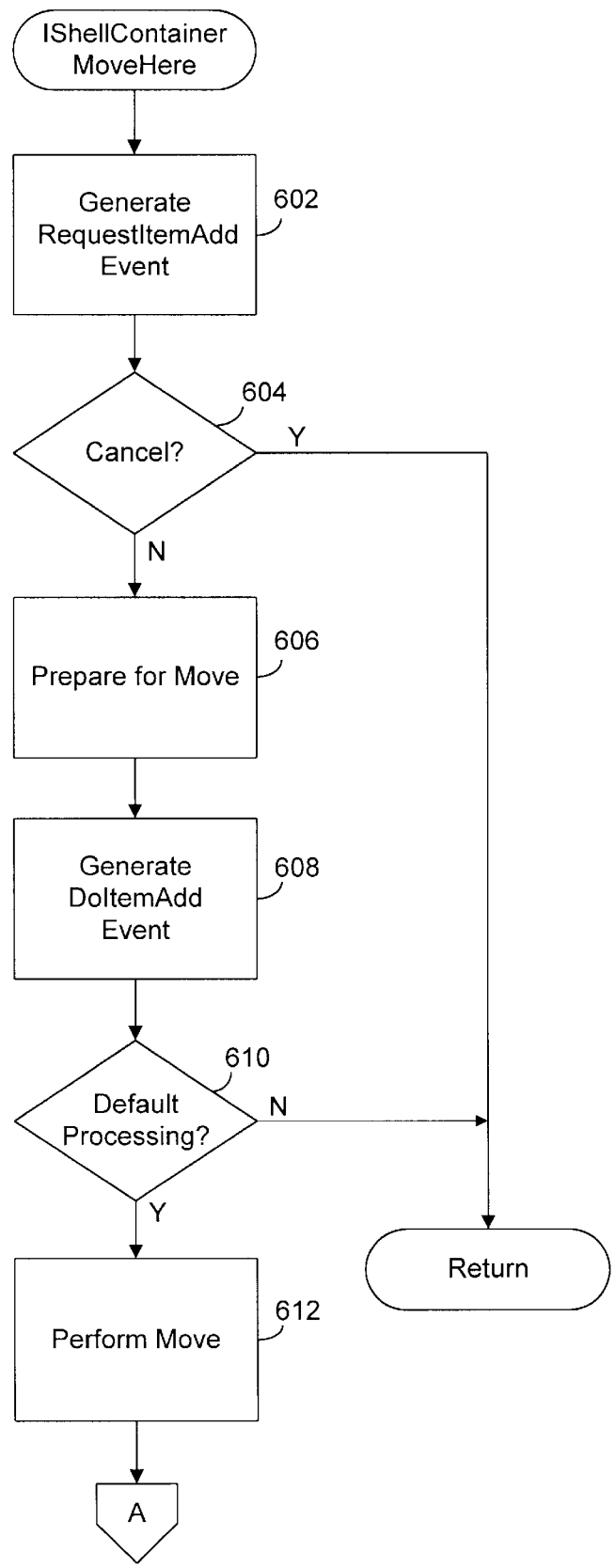
FIGS. 6A and 6B depicts a flow chart of the steps performed by an example implementation of the MoveHere method of the IShellContainer interface.
Figure 6B:
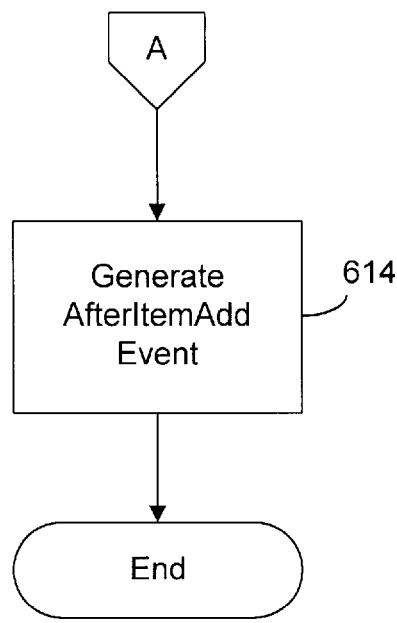

FIGS. 6A and 6B depict a flow chart of the steps performed by an example implementation of the MoveHere method of the IShellContainer interface. The MoveHere method moves an item from a source container to a destination container and generates the associated events. In step 602, the MoveHere method generates a RequestItemAdd event. Upon generation of the event, the event handler (callback routine) defined by the user is executed and returns. In step 604, the MoveHere method determines the value of the cancel parameter returned from the event handler to determine whether to cancel processing. If the cancel parameter indicates that the MoveHere method should cancel processing, processing ends. However, if the cancel parameter indicates that the MoveHere method should continue processing, processing continues to step 606. In step 606, the MoveHere method prepares the item for movement. That is, in this step the MoveHere method may negotiate using the IDataObject interface over the specific medium used for transfer as well as the format of the data. In step 608, the MoveHere method generates the DoItemAdd event. In step 610, the MoveHere method checks the enabledefault parameter returned from the DoItemAdd event to determine whether to continue processing or whether to return. If the enable default parameter indicates that the default processing should not occur, processing ends. However, if the enabledefault parameter indicates that default processing should occur, processing continues to step 612. In step 612, the MoveHere method moves the item using the methods of the IDataObject interface. That is, the MoveHere method stores the item data within the container. For example, if the container stores each item in a separate file, then the method creates a new file and stores the data in the file. The method also updates internal information to track the contents of the container. In step 614, the MoveHere method generates the AfterItemAdd event. Although the example implementation of the MoveHere method has been described as processing one item, one skilled in the art will appreciate that more than one item can be processed by the MoveHere method.

The CopyHere method in the IShellContainer interface copies an item into the container. The punk parameter of the CopyHere method is a reference to the IDataObject interface of the item that is being copied into the container. If, however, more than one item is being copied into the container, the punk parameter contains a reference to an IUnknown interface of a multi-data object. The pcMonikers parameter of the CopyHere method is a return parameter containing a count of the number of items copied into the container. The pppmnk parameter is a triple pointer return parameter referring to the monikers of the items copied into the container. The ppmnk parameter is an optional parameter and, thus, if set to NULL, the CopyHere method does not return the monikers to the caller. The CopyHere method is preferably implemented in a similar fashion to that of the MoveHere method described relative to FIGS. 6A and 6B.

The LinkHere method of the IShellContainer interface creates a link object that contains a reference to an object and adds the link object as an item to the container. The punk parameter of the LinkHere method is a reference to the IUnknown interface of the item that is being linked into the container. If, however, more than one item is being linked into the container, the punk parameter contains a reference to an IUnknown interface of a multi-data object. The pcMonikers parameter of the LinkHere method is a return parameter containing a count of the number of items linked into the container. The pppmnk parameter is a triple pointer return parameter referring to the monikers of the items linked into the container. The ppmnk parameter is an optional parameter and, thus, if set to NULL, the LinkHere method does not return the monikers to the caller. The LinkHere method performs similar functionality and generates the same events as the MoveHere method. The LinkHere method, however, instead of creating an object containing data within the container, the LinkHere method creates a link object containing a moniker which refers to the object.

The GetDataObject method of the IShellContainer interface provides for returning the IDataObject interface for an item. The cMonikers parameter of the GetDataObject method is the count of the number of items for which the caller would like the IDataObject interfaces. The ppmnk parameter is a pointer to a pointer referring to moniker for the item for which the IDataObject is requested. The ppmnk parameter can also refer to a moniker for a multi-data object through which the method can retrieve a list of monikers. The ppDataObject parameter of the GetDataObject method is a return parameter that contains a pointer to the IDataObject interface of the item or items. After receiving the IDataObject interface of an item, the caller may retrieve the data of the item using the methods in the IDataObject interface.

The Delete method in the IShellContainer interface deletes an item from the container. The Delete method has two parameters: ppmnk and cMonikers. The ppmnk parameter is a double pointer to the moniker of an object. The ppmnk parameter may refer to a multi-data object. The cMonikers parameter contains the number of objects referred to by the ppmnk parameter. The Delete method, upon invocation, first generates a RequestItemRemove event. Next, the delete method prepares the item for being deleted which may include accessing the device upon which the item is stored. The delete method then generates a DoItemRemove event, deletes the item and, finally, generates the AfterItemRemove event. After generating both the RequestItemRemove event and the DoItemRemove event, the delete method checks the parameters returned from the events to determine whether to continue processing or to cancel processing.

The Create method in the IShellContainer interface creates an item within the container. The rclsid parameter of the Create method is the class identification for the item. For example, if the item were a spreadsheet, the class identification may refer to the spreadsheet program that created the item. The pwszName parameter is a character string containing the name of the item to be created. The psd parameter is an access control list for the item. The ppmnk parameter is a double pointer to a moniker. This parameter is a return parameter that will contain a reference to the item created. The ppunk parameter is a double pointer to the IUnknown interface of the newly created item. The ppunk parameter is an optional parameter, therefore, if the ppunk parameter is set to NULL, the create method does not return the IUnknown interface. However, if the ppunk parameter is non-NULL, the create method will return the IUnknown interface to the newly created item. The create method creates an item, but the item created contains no data. For example, if the contents of the container are files, then the method may create a file.

The IQueryContainer interface provides for querying a container to retrieve the contents of the container according to selection criteria. After querying the container, the caller receives the IContainerItem interface for the items matching the selection criteria (e.g., read only items). After receiving the IContainerItem interface for an item, the caller can then directly manipulate the item. The IQueryContainer interface is described in Code Table No. 3

---

CODE TABLE NO. 3

---

Interface IQueryContainer: IUnknown {
    virtual IQUERYSPEC *GetQuerySpec() = 0;
    virtual IRESULTSET Execute(IQUERYSPEC pQuerySpec) = 0;
}

---

The GetQuerySpec method of the IQueryContainer interface returns an IQUERYSPEC interface. The methods of IQUERYSPEC interface are used by a caller to define a query for the container to return a list of items that satisfy a specific selection criteria. The allowable selection criteria include the properties contained in the IContainerItem interface. The query can be based on the properties of the items and specified data of an SQL-type language. Thus, for example, by using the IQUERYSPEC interface, a query can be specified using the Classifications property to retrieve all objects created by a specific word processor. The Execute method returns an IRESULTSET which is a linked list of the IContainerItem interfaces for all items that satisfy the selection criteria. The Execute method of the IQueryContainer interface accepts an IQUERYSPEC interface and executes the query as specified by the IQUERYSPEC interface.

The IContainerAutomation interface is layered on top of the IShellContainer interface. That is, the methods of the IContainerAutomation interface invoke the methods of the IShellContainer interface The IContainerAutomation interface is defined in Code Table No. 4.

---

CODE TABLE NO. 4

---

Interface IContainerAutomation: IUnknown {
    Virtual MoveHere() = 0;
    Virtual CopyHere() = 0;
    Virtual LinkHere() = 0;
    Virtual DWORD invoke(ULONG propid, VARIANT * ppropvalue,
        ULONG propaction) = 0;
    VARIANT Contents;
    VARIANT ContentTypes;
    VARIANT TrackUnread;
}

---

The MoveHere method of the IContainerAutomation interface moves an item from a source container into the container referenced by the IContainerAutomation interface (the destination container). The MoveHere method has no parameters. The MoveHere method receives the IContainerItem interface for an item to be moved from the clipboard, moves the item into the destination container, and then deletes the item from the source container.

Figure 7A:
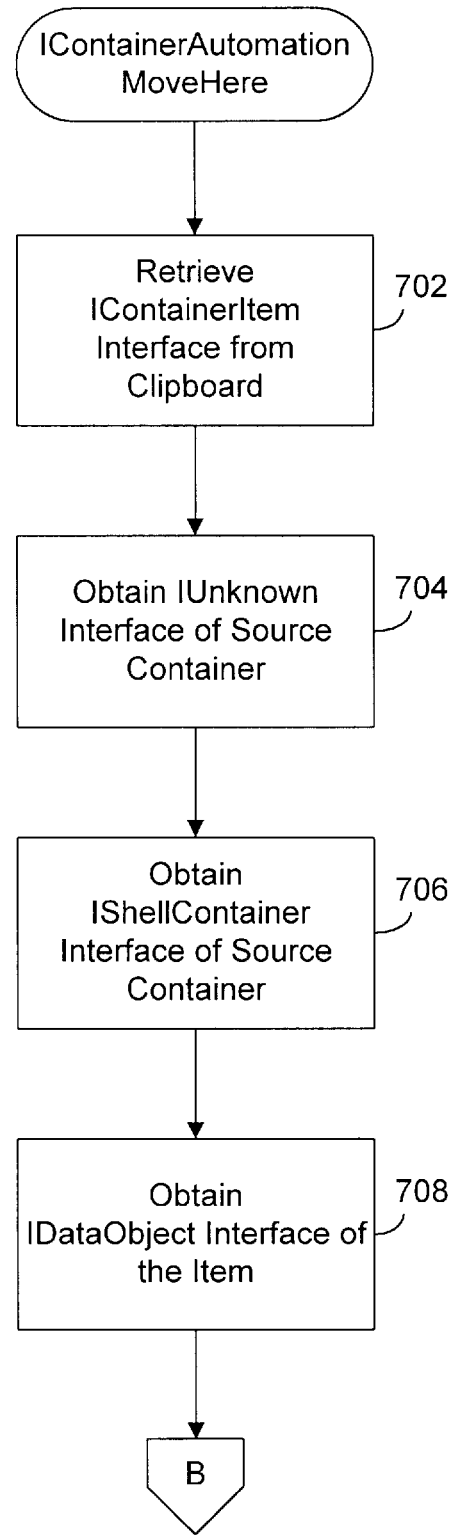
FIGS. 7A and 7B depict a flowchart of the steps performed by an example implementation of the MoveHere method of the IContainerAutomation interface.
Figure 7B:
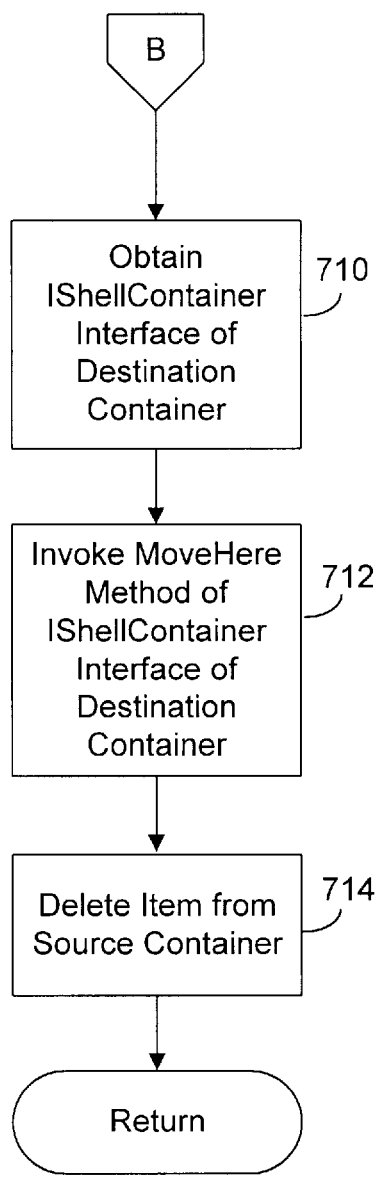

FIGS. 7A and 7B depict a flowchart of the steps performed by an example implementation of the MoveHere method of the IContainerAutomation interface. In step 702, the MoveHere method retrieves the IContainerItem interface for an item from the clipboard. In step 704, the MoveHere method obtains the IUnknown interface of the source container from the Container property of the IContainerItem interface. In step 706, the MoveHere method invokes the QueryInterface method of the IUnknown interface of the source container to obtain the IShellContainer interface. In step 708, the MoveHere method obtains the IDataObject interface for the item being moved by invoking the GetDataObject method of the IShellContainer interface with the moniker obtained from the Moniker property of the IContainerItem interface. In step 710, the MoveHere method obtains the IShellContainer interface for the destination container by invoking the QueryInterface method of the IUnknown interface. In step 712, the MoveHere method of the IContainerAutomation interface invokes the MoveHere method of the IShellContainer interface of the destination container to copy the item from the source container to the destination container. In step 714, upon successfully moving the item as indicated by the return code of the MoveHere method of the IShellContainer interface, the MoveHere method of the IContainerAutomation interface invokes the delete method of the IContainerItem interface to delete the item from the source container.

The CopyHere method of the IContainerAutomation interface copies an item from a source container into the container referenced by the IContainerAutomation interface (the destination container). The CopyHere method has no parameters. The CopyHere method receives the IContainerItem interface for an item to be copied from the clipboard and copies the item into the destination container. An example implementation of the CopyHere method would be similar to that described relative to the MoveHere method except that the CopyHere method of the IShellContainer interface is invoked instead of the MoveHere method and the item is not deleted from the source container.

The LinkHere method of the IContainerAutomation interface adds a link into the container. The LinkHere method receives an IContainerItem interface from the clipboard for an item to be linked into the container and stores a link into the container. The processing performed by the LinkHere method would be similar to that as described for the MoveHere method except that the LinkHere method of the IShellContainer interface is invoked instead of the MoveHere method and the item is not deleted from the source container.

The Invoke method of the IContainerAutomation interface is used to retrieve and set the values of the properties in the IContainerAutomation interface. The Invoke method has three parameters: propid, ppropvalue and propaction. The propid parameter of the invoke method indicates which property is to be accessed. The ppropvalue parameter is a pointer to a memory location wherein the invoke method either returns a value of a property or is passed a value of a property. The propaction parameter indicates whether to retrieve the value of the indicated property or whether to set the value of the indicated property.

The IContainerAutomation interface provides three properties. The first property is the Contents property which contains a list of the contents of the container. Each entry in the list is a pointer to the IContainerItem interface for the item. The ContentTypes property contains the type of items stored within the container. The TrackUnread property of the IContainerAutomation interface indicates whether the container stores information regarding which items have and have not been read by a user.

Figure 8:
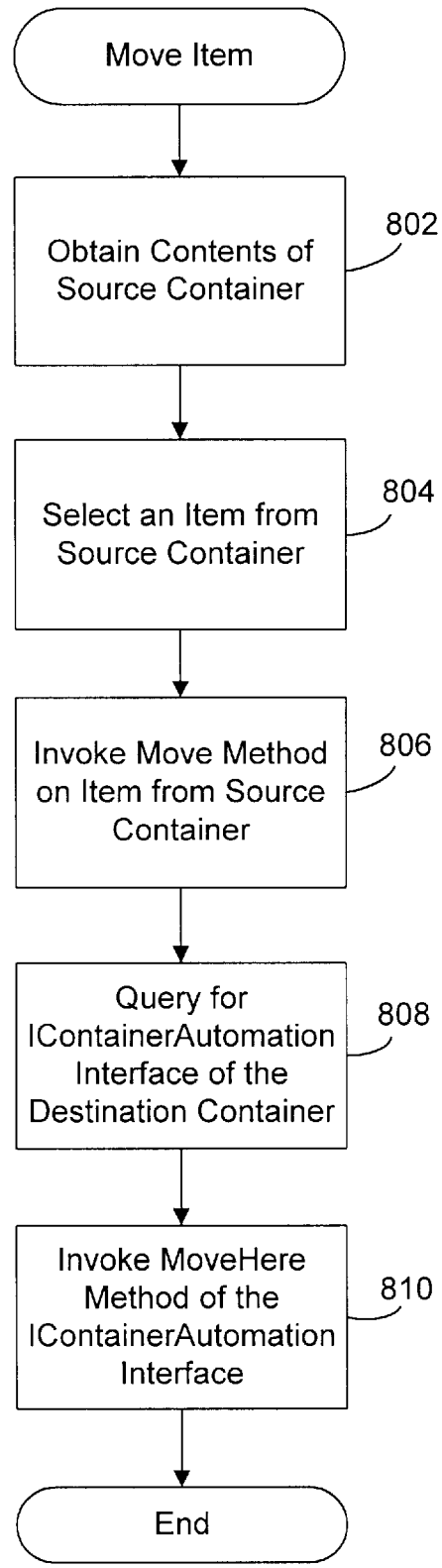
FIG. 8 depicts a flow chart of the steps performed in moving an item from a source container to a destination container by the UI.

FIG. 8 depicts a flow chart illustrating steps performed in moving an item from a source container to a destination container by the UI. In step 802, the UI queries the source container for the contents of the source container. The UI performs this query through the IQueryContainer interface. The UI may also determine the Contents by accessing the contents property of the IContainerAutomation interface of the source container. In step 804, the UI selects an item from the list. Since the list of items is actually a list of IContainerItem interfaces for the items, in this step, an IContainerItem interface for the selected item is obtained. In step 806, the UI invokes the Move method of the IContainerItem interface on the selected item. The Move method on the selected item copies the IContainerItem interface to the clipboard. In step 808, the UI retrieves the container for the IContainerAutomation interface of the destination container using the QueryInterface method of the IUnknown interface. In step 810, the UI invokes the MoveHere method of the IContainerAutomation interface of the destination container. The invocation of the MoveHere method moves the item from the source container to the destination container and deletes the item from the source container.

The preferred embodiment provides for the replacement of the methods in the IQueryContainer, the IShellContainer and the IContainerAutomation interfaces. That is, a developer wishing to create a container implements one or more methods for the IQueryContainer, the IShellContainer and the IContainerAutomation interfaces to provide specialized processing. Although the MoveHere method of the IShellContainer interface has been described as moving an item into a container, for example, a developer may define additional functionality to be performed by the MoveHere method. Thus, as described above, a developer of a container may implement the MoveHere method of the IShellContainer interface to perform restricted storing, that is, checking the properties of an item to determine whether to allow the item to be moved into the container. The MoveHere method of this example could be implemented by checking the Classifications property of the IContainerItem interface to determine the type of item before actually moving the item into the container. If the type is not appropriate, the MoveHere method would not perform the move. Since the preferred embodiment of the present invention allows for the replacement of the methods contained in the interfaces of the container, the preferred embodiment allows for the customization of containers to specific uses.

Figure 9:
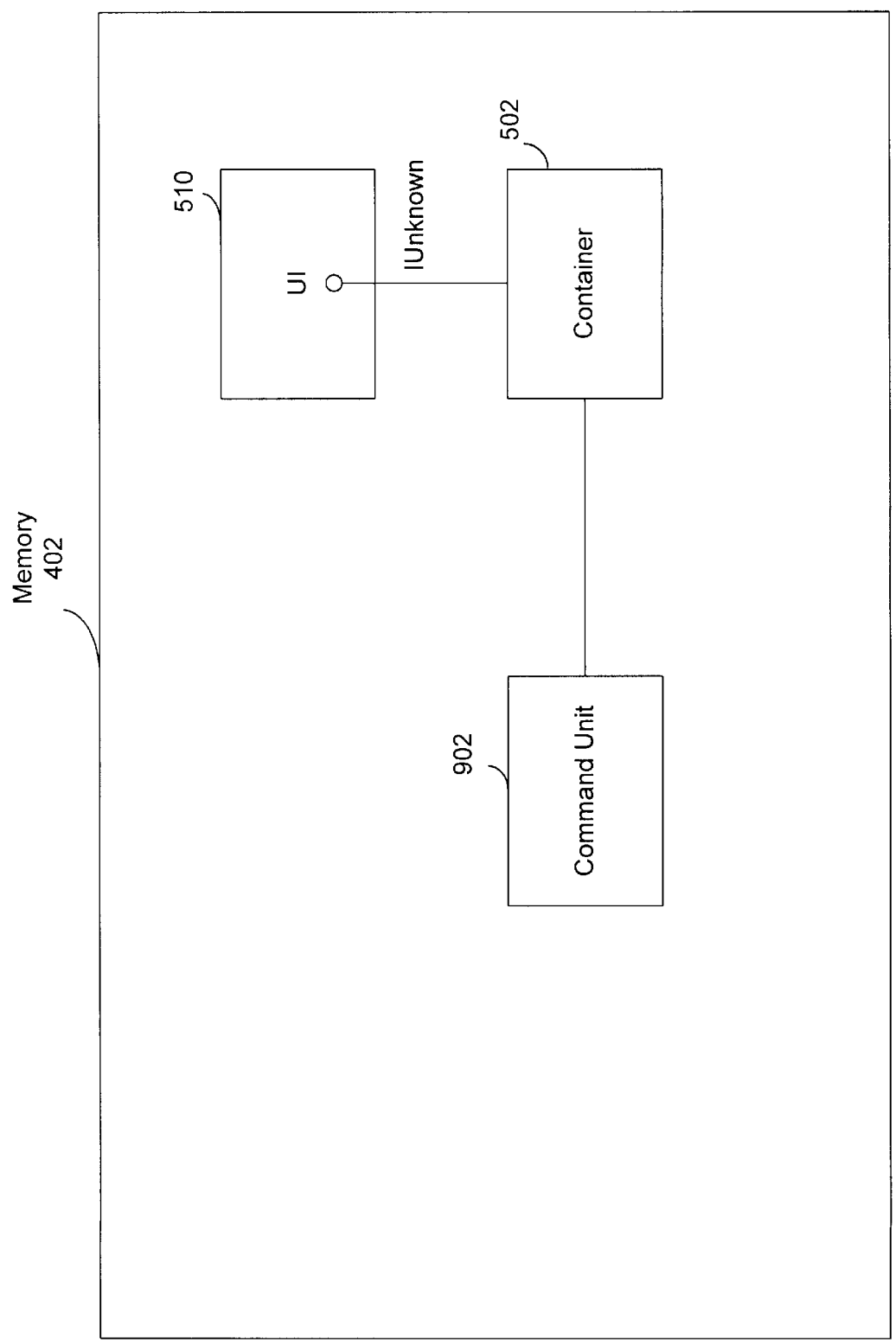
FIG. 9 depicts a diagram of the components used for extending the functionality of a container.

In regard to the extendibility of the containers of the preferred embodiment, FIG. 9 depicts a diagram of the components used for extending the functionality of a container. The memory 402 contains a command unit 902, the UI 510, and the container 502. The command unit 902 registers the event handlers with the container 502. The event handlers can be procedures defined in a macro language that are invoked in response to the container 502 generating an event. The container 502 receives addresses of the event handlers from the command unit 902 and stores ("registers") the addresses so that when the container generates an event, a corresponding event handler is invoked. For instance, a registered event handler that corresponds to the DoItemAdd event for a container is invoked when the container generates the DoItemAdd event. The interaction between the command unit 902 and the container 502 allows for the extendibility of the container. Although the command unit 902 is shown as being a separate object from the container, the command unit is an aggregate object that contains the container. The aggregation between objects is described in U.S. patent application Ser. No. 08/185,465, entitled "Method and System for Aggregating Objects," which is hereby incorporated by reference.

Event processing in the preferred embodiment is performed in two phases: a registration phase and an invocation phase. In the registration phase, a command unit registers the event handlers to be used in the invocation phase. In the invocation phase, events are generated by the methods of the IShellContainer interface and, in response thereto, the corresponding event handlers are invoked. An example event handler in a macro language is provided in Code Table No. 5.

CODE TABLE NO. 5

```
Sub RequestItemAdd(PCONTAINERITEM pContainerItem,
BOOL cancel)
    If pContainerItem->Classifications != "MSSpreadsheet" Then
        cancel = True
    Else
        cancel = False
End Sub
```

The event handler of Code Table No. 5 performs the restricted storing functionality. The event handler corresponds to the RequestItemAdd event, thus, the event handler is invoked every time that an item is attempted to be moved or copied into the container, such as through the MoveHere or CopyHere methods of the IShellContainer interface. This event handler only allows items of type "MSSpreadsheet" into the container. This is done by the event handler checking the Classifications property to determine whether an item to be added to the container is of the correct type. If the item is not an MSSpreadsheet, the cancel parameter is set to true and the method from which the event handler was invoked, is instructed to cancel processing. If, however, the item is of type MSSpreadsheet, the event handler allows the method to add the item into the container. Although the event handlers have been described using a macro language, one skilled in the art will recognize that the present invention can be used to create event handlers using any programming language. In addition, although one example of an event handler is provided, one skilled in the art will recognize that other useful functionality can be provided by event handlers. For example, an event handler can be created to keep various statistical information about the contents of a container and to enforce access control.

Figure 10:
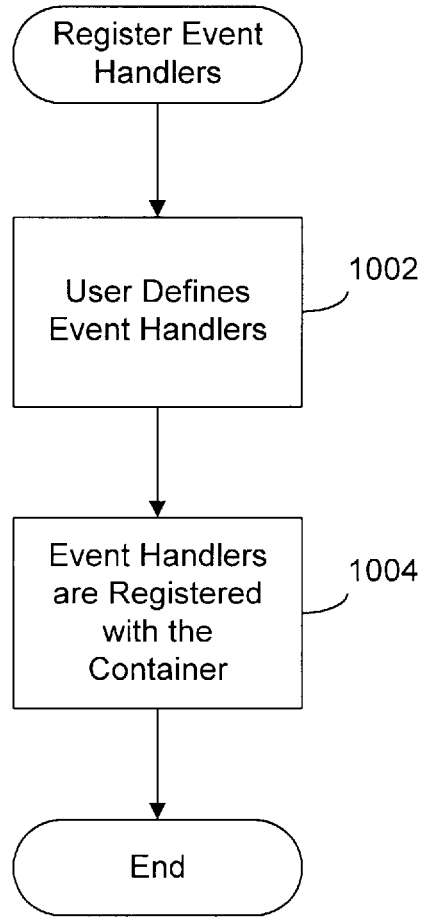
FIG. 10 depicts a flow chart of the steps performed during the registration phase of event processing by the preferred embodiment.

FIG. 10 depicts a flow chart of the steps performed during the registration phase of event processing by the preferred embodiment. In step 1002, the user defines event handlers using the command unit. The user may define an event handler to be invoked for each event generated by the methods of the IShellContainer interface. In step 1004, the command unit registers the event handlers with the container. The registration of the event handlers with the container is performed as described in U.S. patent application Ser. No. 08/166,976, entitled "Method and System for Dynamically Generating Object Connections," which is hereby incorporated by reference.

Figure 11:
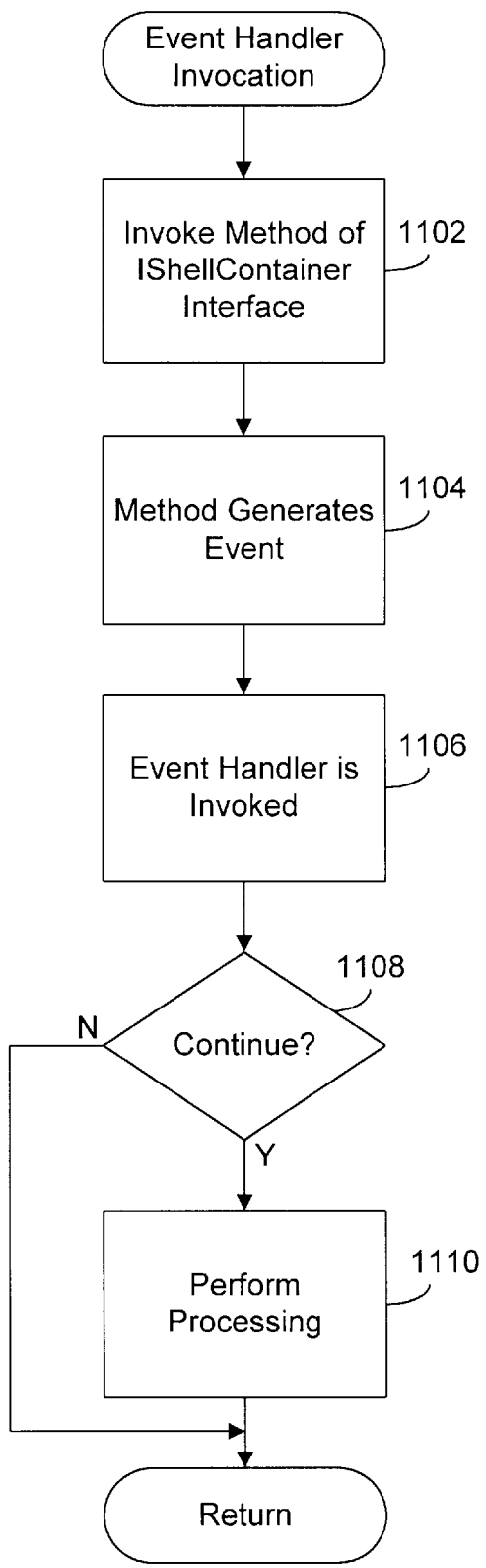
FIG. 11 depicts a flow chart of the steps performed during the invocation phase of event handling by the preferred embodiment.

FIG. 11 depicts a flow chart of the steps performed during the invocation phase of event handling, by the preferred embodiment. In step 1102, a method of the IShellContainer interface is invoked on a container; for example, the MoveHere method. In step 1104, during the processing of the MoveHere method of the IShellContainer interface, an event is generated such as the RequestItemAdd event. In step 1106, upon the invocation of an event, the event handler for the event is invoked, such as the event handler described in Code Table No. 5. The event handler performs processing and then returns a value (e.g. cancel) to instruct the method on whether to continue processing or whether to cancel processing. In step 1108, the MoveHere method determines whether to continue processing and either continues processing in step 1110 or cancels processing. In step 1110, if the MoveHere method continues processing, the MoveHere method may generate other events (and execute the corresponding event handlers) and may perform the move of the item unless the executed event handlers override the processing of the MoveHere method.

While the present invention has been described with reference to a preferred embodiment thereof, those skilled in the art will know of various changes in form that may be made without departing from the spirit and scope of the claimed invention, as defined in the appended claims.

We claim:

1. A method in a computer system for customizing functionality of a container, the method performed by the container, comprising the steps of:

receiving an indication of an event handler containing code to be executed upon occurrence of an event;

upon occurrence of the event, invoking the event handler such that the code of the event handler executes and determines whether the event should be canceled;

receiving a status indication from the event handler, the status indication indicating whether the event should be canceled; and when the status indication indicates that the event should be canceled, canceling the event.

2. A distributed system comprising:

a command unit for receiving instructions from a user, for creating event handlers in response to receiving the instructions and for registering the event handlers; and a container for registering the event handlers received from the command unit and for invoking the event handlers when performing functionality, the functionality for storing and maintaining information in the distributed system.

3. The distributed system of claim 2 wherein the information maintained and stored by the container comprises a plurality of objects, wherein the plurality of objects have a plurality of types, wherein a first type of object contains information, wherein a second type of object contains a reference to an object of the first type.

4. The distributed system of claim 2 wherein the distributed system comprises a plurality of computer systems and wherein the container and the command unit are located on separate computer systems.

5. A computer system for modifying functionality of a container, the container for receiving requests to perform functionality and for performing the functionality, the functionality for storing and maintaining information, the computer system comprising:

means for receiving a request to perform functionality;

means, responsive to receiving the request, for generating an event;

means, responsive to generating the event, for receiving an indicator;

means, responsive to receiving the indicator, for determining whether to perform the requested functionality by the container;

means, responsive to determining whether to perform the requested functionality, for canceling the requested functionality when the container determines not to perform the requested functionality; and means, responsive to determining whether to perform the requested functionality, for performing the requested functionality when the container determines to perform the requested functionality.

6. A method in a computer system for modifying functionality of a container, the functionality of the container for storing and maintaining information, the method comprising the steps of:

receiving instructions from a user, wherein the instructions modify the functionality of the container;

creating event handlers that contain the received instructions; and registering the created event handlers with the container to create registered event handlers wherein at least one of the registered event handlers is invoked to effect the modification of the functionality when an event is generated by the container.

7. A method in a computer system for modifying functionality of a container, the container for registering event handlers, for receiving requests to perform functionality, and for invoking the event handlers when performing the functionality, the event handlers for instructing the container, the functionality for storing and maintaining information, the method comprising the steps of:

under the control of the container,
registering the event handlers with the container;
receiving a request to perform functionality after registering the event handlers; and
performing the functionality such that at least one of the event handlers is invoked.

8. A computer system for modifying functionality of a container comprising:

a container having functionality for maintaining a logical grouping of objects and having methods for performing the functionality; and a replaceability component for replacing the functionality of the container by replacing the methods of the container.

9. The computer system of claim 8, further comprising:

a contents component for maintaining an indication of contents of the container, wherein the contents has a plurality of types;

a types component for maintaining an indication of the types of the contents; and an unread component for maintaining an indication of whether the contents of the container have been viewed by a user.

10. A computer system for modifying functionality of a container comprising:

a container having functionality for maintaining a logical grouping of objects, wherein the container performs the functionality through processing of methods, wherein the methods generate events during the processing; and an extendibility component for receiving the events and for performing processing that extends the functionality of the container in response to receiving the events.

11. The computer system of claim 10, further comprising:

a command unit for receiving instructions from a user, for creating event handlers in response to receiving the instructions of the user, for receiving the events from the container and for invoking the event handlers in response to receiving the events from the container to perform the instructions of the user, the event handlers for being invoked when the container generates the events and for performing the instructions of the user.

12. A method in a computer system for programming a container, the container having an implementation and having functionality for storing and maintaining objects containing information and references to objects, the method comprising the steps of:

replacing the implementation of the container to modify the functionality of the container; and extending the functionality of the container in response to replacing the implementation of the container.

13. The method of claim 12 wherein the implementation of the container comprises a plurality of methods for performing the functionality of the container, wherein the step of replacing the implementation of the container further includes the step of replacing the methods of the implementation of the container.

14. The method of claim 12 wherein the container generates events when performing the functionality of the container, wherein the step of extending the functionality of the container includes the step of generating the events when the functionality of the container is performed.

15. The method of claim 14 wherein the computer system contains a command unit for receiving instructions from a user, for generating event handlers in response to receiving the instructions of the user, for receiving the events of the container and for invoking the event handlers in response to receiving the events of the container, further including the steps of:

invoking the command unit to generate the event handlers; and invoking at least one of the event handlers by the command unit when the container generates the events.

16. A method in a computer system having a container for managing objects and for generating events, the method performed by the container, comprising the steps of:

receiving an indication of a listener to be notified upon generation of an event indicating that an action is to be performed on at least one of the objects;

determining that the action is to be performed on the at least one of the objects;

generating the event responsive to determining that the action is to be performed; and notifying the listener responsive to the generation of the event.

17. The method of claim 16, further including the step of receiving a request to remove one of the managed objects and wherein the step of determining includes determining that the action is to be performed responsive to receiving the request to remove one of the managed objects.

18. The method of claim 16, further including the step of receiving a request to move a new object into the container so that the container manages the new object, and wherein the step of determining includes determining that the action is to be performed responsive to receiving the request to move the new object into the container.

19. The method of claim 16, further including the step of receiving a request to add a link to a managed object, and wherein the step of determining includes determining that the action is to be performed responsive to receiving the request to add the link.

20. The method of claim 16 wherein the step of receiving an indication includes receiving a reference to an event handler and wherein the step of generating an event includes invoking the event handler.

21. The method of claim 20 wherein the step of invoking the event handler includes canceling the action.

22. A computer-readable medium containing instructions for controlling a computer system to perform a method, the computer system having a container for managing objects and for generating events, the method performed by the container, comprising the steps of:

receiving an indication of a listener to be notified upon generation of an event indicating that an action is to be performed on at least one of the objects;

determining that the action is to be performed on the at least one of the objects;

generating the event responsive to determining that the action is to be performed; and notifying the listener responsive to the generation of the event.

23. The computer-readable medium of claim 22, further including the step of receiving a request to remove one of the managed objects and wherein the step of determining includes determining that the action is to be performed responsive to receiving the request to remove one of the managed objects.

24. The computer-readable medium of claim 22, further including the step of receiving a request to move a new object into the container so that the container manages the new object, and wherein the step of determining includes determining that the action is to be performed responsive to receiving the request to move the new object into the container.

25. The computer-readable medium of claim 22, further including the step of receiving a request to add a link to a managed object, and wherein the step of determining includes determining that the action is to be performed responsive to receiving the request to add the link.

26. The computer-readable medium of claim 22 wherein the step of receiving an indication includes receiving a reference to an event handler and wherein the step of generating an event includes invoking the event handler.

27. The computer-readable medium of claim 26 wherein the step of invoking the event handler includes canceling the action.

\* \* \* \* \*